Aug. 13, 1935.   C. SHAW   2,011,529
DOWEL
Filed March 12, 1935
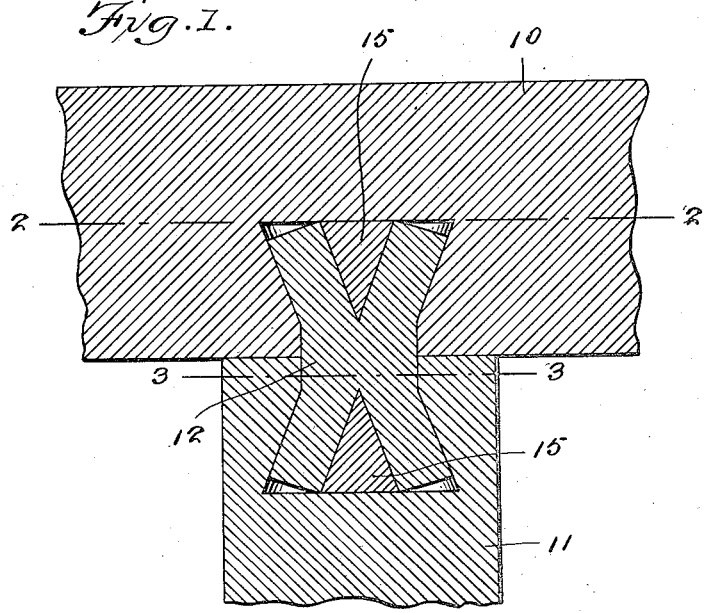
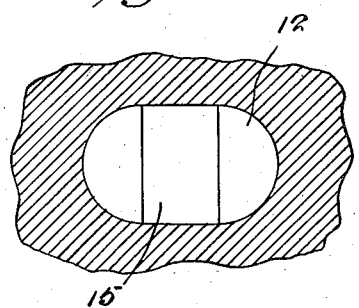
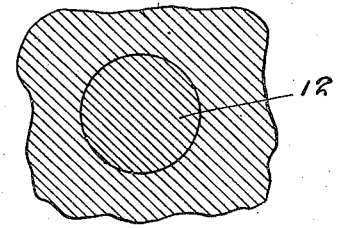
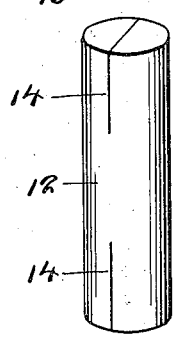
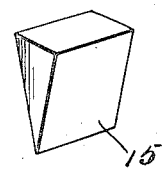
Claude Shaw
INVENTOR
BY Victor J. Evans & Co.
ATTORNEY Patented Aug. 13, 1935

2,011,529

UNITED STATES PATENT OFFICE 2,011,529

DOWEL

Claude Shaw, Bristol, Va.

Application March 12, 1935, Serial No. 10,726

4 Claims. (Cl. 20—92)

The object of the invention is to provide a dowel for use in manufactures of wood for the purpose of connecting two parts together, so that said parts will be positively precluded from separation or from relative angular or turning movement with the dowel as a pivot; to provide a dowel which is manufactured according to the conventional method and secures its positive locking action when being applied as a connecting means between two parts; and generally to provide a dowel construction which is of simple form and susceptible of cheap manufacture.

With this object in view, the invention consists in a construction and combination of parts, of which a preferred embodiment is illustrated in the accompanying drawing, wherein:

Figure 1 is a sectional view showing the application of the invention.

Figures 2 and 3 are sectional views on the planes 2—2 and 3—3 respectively of Figure 1.

Figure 4 is a perspective view of the dowel.

Figure 5 is a perspective view of the locking wedge.

In securing two parts together as, for example, the members 10 and 11, both are bored inwardly from the faces which will be brought into contact to provide sockets for the reception of the dowel, the holes or sockets being initially cross-sectionally circular. In both members, the holes are laterally enlarged on diametrically opposite sides, so that they are of oval form at their bottoms as on the plane of the line 2—2 of Figure 1. The dowel sockets thus are of uniform diameter in one diametrical plane and are of progressively increasing diameter from the outer faces of the members to the bottoms of the sockets in a plane at right angles to the plane of uniform diameter, so that when the dowel pin 12 is inserted, it may be spread at its free ends to fill the sockets where they are laterally enlarged.

In order that the dowel may be spread as intended, it is split, as indicated at 14, the split extending in from opposite ends, and wedges 15 are employed, the angle of the wedge being the same as the angle at which the socket is enlarged.

In attaching the two parts, the edges of the wedges are inserted in the splits 14 of the dowel and, the width of the wedges being the same as the diameter of the dowel, the wedges first enter the sockets and as the two members are forced together and the dowel enters the sockets, its ends are spread by the wedges, so that these ends are moved out into the lateral enlargements of the sockets. When the facing sides of the members to be attached by the dowel are in contact, both sockets are filled with the spreading ends of the dowels and the wedges and the members are thereby locked together so that they may not be separated by forces acting in the direction of the axis of the dowel, nor may the members be angularly turned relatively because of the fact that the bottoms of the sockets are oval shape, which precludes any turning of the members with respect to the dowel or with respect to each other with the dowel as an axis.

The invention having been described, what is claimed as new and useful is:

1. In combination with two members to be secured together, a cross-sectionally circular dowel carried by the one and entering a correspondingly formed socket in the other, the socket being of uniform cross section from its open end to an intermediate point in its length and from said point to its bottom being of cross-sectionally oval form in which the major diameter of the oval progressively increases while the minor diameter remains constant, the dowel being split from its free end a distance equal to the depth of the oval portion of the socket, and means entering the split in the dowel and spreading the extremities of the latter into the more largely dimensioned portion of the socket.

2. In combination with two members to be secured together, a cross-sectionally circular dowel carried by the one and entering a correspondingly formed socket in the other, the socket being of uniform cross section from its open end to an intermediate point in its length and from said point to its bottom being of cross-sectionally oval form in which the major diameter of the oval progressively increases while the minor diameter remains constant but equal to the diameter of the circular portion, the dowel being split from its free end a distance equal to the depth of the oval portion of the socket, and means entering the split in the dowel and spreading the extremities of the latter into the more largely dimensioned portion of the socket.

3. In combination with two members to be secured together, a cross-sectionally circular dowel carried by the one and entering a correspondingly formed socket in the other, the socket being of uniform cross section from its open end to an intermediate point in its length and from said point to its bottom being of cross-sectionally oval form in which the major diameter of the oval progressively increases in a fixed plane while the minor diameter remains constant and equal to the diameter of the circular portion, the dowel being split from its free end a distance equal to the depth of the oval portion of the socket, and a wedge entering the split in the dowel and having its wider end seated on the bottom of the socket and its edge in the plane where the increase in the size of the socket begins.

4. In combination with two members to be secured together, a cross-sectionally circular dowel carried by the one and entering a correspondingly formed socket in the other, the socket being of uniform cross section from its open end to an intermediate point in its length and from said point to its bottom being of cross-sectionally oval form in which the major diameter of the oval progressively increases in a fixed plane while the minor diameter remains constant and equal to the diameter of the circular portion, the dowel being split from its free end a distance equal to the depth of the oval portion of the socket, and a wedge entering the split in the dowel and having its wider end seated on the bottom of the socket and its edge in the plane where the increase in the size of the socket begins, the wedge being of a width equal to the minor diameter of the oval portion of the socket and having the angle of divergence of its slanting sides the same as the angle at which the major diameter of the oval portion of the socket increases.

CLAUDE SHAW.